United States Patent [19]
Matsuda

[11] Patent Number: 5,978,731
[45] Date of Patent: Nov. 2, 1999

[54] VEHICLE CONTROL SYSTEM

[75] Inventor: Shohei Matsuda, Saitama, Japan

[73] Assignee: Honda Giken Kogyo Kabushiki Kaisha, Tokyo, Japan

[21] Appl. No.: 08/967,703

[22] Filed: Nov. 10, 1997

[30] Foreign Application Priority Data

Nov. 12, 1996 [JP] Japan ................................ 8-300280

[51] Int. Cl.$^6$ .............................................. G06F 165/00
[52] U.S. Cl. .............................. 701/208; 701/1; 701/93; 701/301; 340/988; 180/179
[58] Field of Search ..................... 701/1, 93, 96, 701/200, 207, 208, 211, 301; 340/903, 988, 990, 995; 180/167, 168, 169, 170, 179

[56] References Cited

U.S. PATENT DOCUMENTS

| | | | |
|---|---|---|---|
| 5,465,089 | 11/1995 | Nakatani et al. | 701/211 |
| 5,539,397 | 7/1996 | Asanuma et al. | 701/208 |
| 5,546,311 | 8/1996 | Sekine | 701/301 |
| 5,661,650 | 8/1997 | Sekine et al. | 701/207 |
| 5,748,476 | 5/1998 | Sekine et al. | 701/93 |

FOREIGN PATENT DOCUMENTS 636187  2/1994  Japan .

*Primary Examiner*—Gary Chin
*Attorney, Agent, or Firm*—Carrier, Blackman & Associates, P.C.; Joseph P. Carrier; William D. Blackman

[57] ABSTRACT

A vehicle control system makes it possible to properly decide the passableness of a road curve in the forward direction of a subject vehicle by setting a tentative position ahead of an actual position by a tentative position setting mechanism M4, and calculates an estimated passage speed at the tentative position by an estimated passage speed calculating mechanism M5 on the basis of the distance between the actual position and the tentative position. A curve curvature radius calculating mechanism M6 and a curve length calculating mechanism M7 calculate the radius of curvature and length of a curve existing on a road ahead of the tentative position, on the basis of a map data outputted by a map data outputting mechanism M1, and a proper passage speed calculating mechanism M8 calculates the proper curve passing speed on the basis of the curvature radius and length of the curve. A passableness deciding mechanism M9 decides the passableness of the vehicle by comparing the estimated passing speed and the proper passing speed so that a vehicle control mechanism M10 controls the vehicle to allow it to pass the curve when it is decided that the vehicle cannot safely pass the curve.

14 Claims, 9 Drawing Sheets

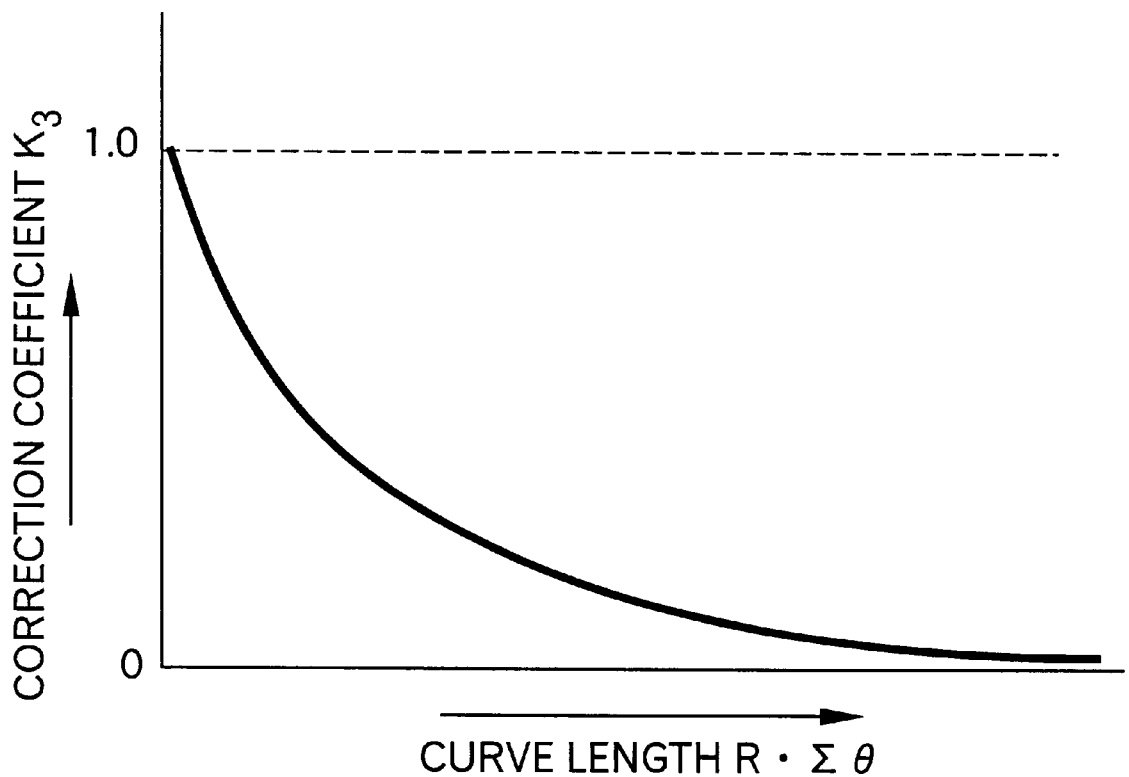

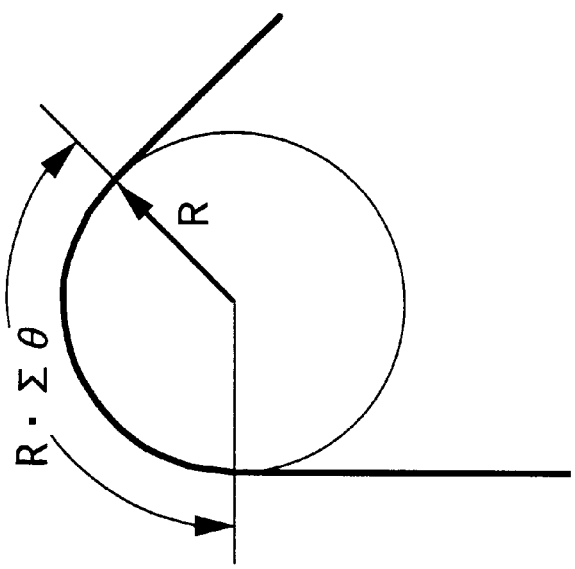
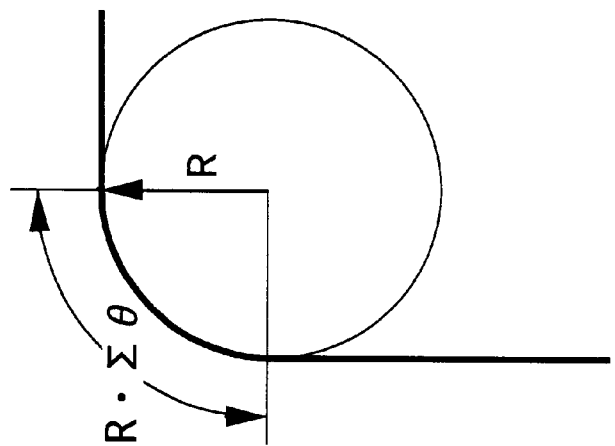
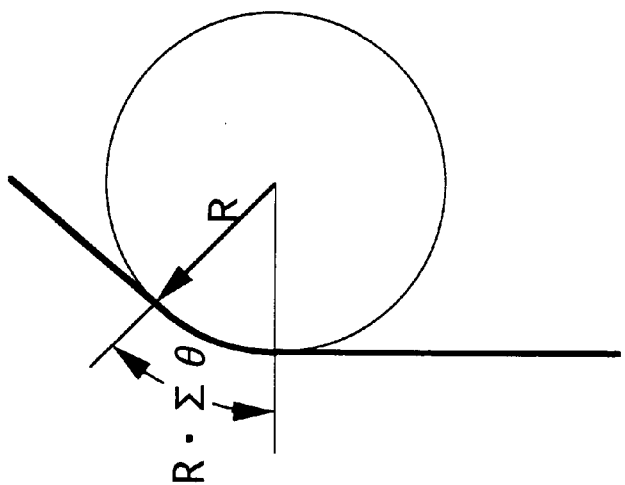

VEHICLE CONTROL SYSTEM

BACKGROUND OF THE INVENTION

1. Technical Field to Which the Invention Belongs

The present invention relates to a vehicle control system for controlling a vehicle on the basis of a road shape, as decided on the basis of map data comprised of a set of coordinate points obtained by a navigation system.

2. Discussion of Relevant Art

In Japanese Patent Laid-Open No. 6-36187, there is well known a technique in which a control system decides whether or not a subject vehicle can pass a curve ahead thereof in its running direction at the current speed by estimating the radius of curvature of the curve on the basis of map data obtained by a navigation system, so that a warning or automatic deceleration is performed if the system decides that the curve is not passable.

Here, the aforementioned well known technique decides whether or not the vehicle can pass a curve, by employing the radius of curvature of the curve as a parameter. Even if curves have the same curvature radius R, as shown in FIGS. 7A to 7C, the passage is easy for a curve having a smaller length $R \cdot \Sigma \theta$ (as should be referred to FIG. 7A), but the passage is difficult for a curve having a larger length $R \cdot \Sigma \theta$ (as should be referred to FIG. 7C). In order to properly decide whether or not a curve can be safely passed, therefore, it is necessary to consider not only the curvature radius of the curve but also the length of the curve.

According to the known technique, when a curve is difficult to pass, the vehicle speed is automatically reduced to pass the curve. In this case, any voluntary decelerating operation or steering operation of the driver and the aforementioned automatic deceleration may interfere with each other to give the driver an unfamiliar or unpleasant feeling.

SUMMARY OF THE INVENTION

The present invention has been conceived in view of the background described above and has an object to decide the passableness of a curve more properly and to prevent the automatic vehicle speed adjustment at a curve from giving the driver any unfamiliar or unpleasant feeling.

According to the first aspect and feature of the invention there is provided a vehicle control system comprising:

map data outputting means (M1) for outputting map data containing coordinate points (N) of a road to be followed by a vehicle;

actual position detecting means (M2) for detecting an actual position of the vehicle ($P_0$) on a map;

vehicle speed detecting means (M3) for detecting a vehicle speed ($V_0$);

tentative position setting means (M4) for setting a tentative position ($P_1$) on the road ahead of the actual position of the vehicle ($P_0$);

estimated passage speed calculating means (M5) for calculating an estimated passage speed ($V_1$) in the tentative position ($P_1$) on the basis of a distance between the actual position ($P_0$) and the tentative position ($P_1$);

curve curvature radius calculating means (M6) for calculating a radius of curvature (R) of a curve existing on the road ahead of the tentative position ($P_1$) on the basis of the map data;

curve length calculating means (M7) for calculating the length ($R \cdot \Sigma \theta$) of the curve existing on the road ahead of the tentative position ($P_1$) on the basis of the map data;

proper passage speed calculating means (M8) for calculating a proper curve passing speed ($V_R$) on the basis of the curve curvature radius (R) and the length of the curve ($R \cdot \Sigma \theta$);

passableness deciding means (M9) for deciding the passableness of the vehicle through the curve by comparing the estimated passage speed ($V_1$) and the proper passing speed ($V_R$); and vehicle control means (M10) for controlling the vehicle when it is decided that the vehicle cannot safely pass the curve.

According to a second aspect and feature of the invention, the length of the curve ($R \cdot \Sigma \theta$) is calculated easily and reliably on the basis of the sum of the angles of intersection ($\theta$) of individual segments joining adjacent ones of the coordinate points.

According to a third aspect and feature of the invention, the sum of the intersection angles ($\theta$) of the individual segments is calculated as the sum of the continuous intersection angles each being not less than a predetermined angle. As a result, the summation is interrupted at portions having a small curvature, thereby to prevent the curve from being calculated longer than it actually is.

According to a fourth aspect and feature of the invention, the number of the continuous intersection angles ($\theta$) to be summed is varied on the basis of the vehicle speed. As a result, the length of the curve is prevented from being calculated longer than necessary, when the vehicle speed is low.

According to a fifth aspect and feature of the invention, the number of the continuous intersection angles ($\theta$) to be summed is further restricted on the basis of a predetermined time period. As a result, the length of the curve is more reliably prevented from being calculated longer than necessary, when the vehicle speed is low.

According to a sixth aspect and feature of the invention, automatic vehicle speed adjusting means (M10) adjusts the vehicle speed automatically in an automatic vehicle speed adjusting section, as set by automatic vehicle speed adjusting section setting means (M11), when the vehicle passes the curve. As a result, the automatic vehicle speed adjustment is prevented from being effected excessively frequently, because it might interfere with the driving operation of the driver.

According to a seventh aspect and feature of the invention, the automatic vehicle speed adjusting section is set on the basis of a reference transverse acceleration ($G_0$) in the curve. As a result, the voluntary driving operation of the driver can be prevented from interfering with the automatic vehicle speed adjustment at the central portion, which provides the minimum radius of curvature, of the curve.

According to an eighth aspect and feature of the invention, the automatic vehicle speed adjusting section is calculated on the basis of the sum of the intersection angles ($\theta$) of the individual segments joining adjacent ones of the coordinate points (N). As a result, the automatic vehicle speed adjusting section can be calculated easily and reliably.

According to still further aspects and features of the invention, the automatic vehicle speed adjusting means (M10) interrupts or suppresses the automatic vehicle speed adjustment when the vehicle speed, steering angle or amount of transverse behavior falls within a predetermined range therefor during the automatic vehicle speed adjustment. As a result, it is possible to avoid the interference between the voluntary driving operations of the driver and the automatic vehicle speed adjustment.

BRIEF EXPLANATION OF THE DRAWINGS

FIG. 6 is a graph plotting a relation between the length of a curve and a correction coefficient k3.

FIG. 7 is a diagram illustrating a relation between the length of a curve and turning easiness according to the embodiment of the invention.

DETAILED DESCRIPTION OF THE PREFERRED EMBODIMENT

The present invention will be described in connection with the presently preferred embodiment thereof with reference to the accompanying drawings.

Figure 1:
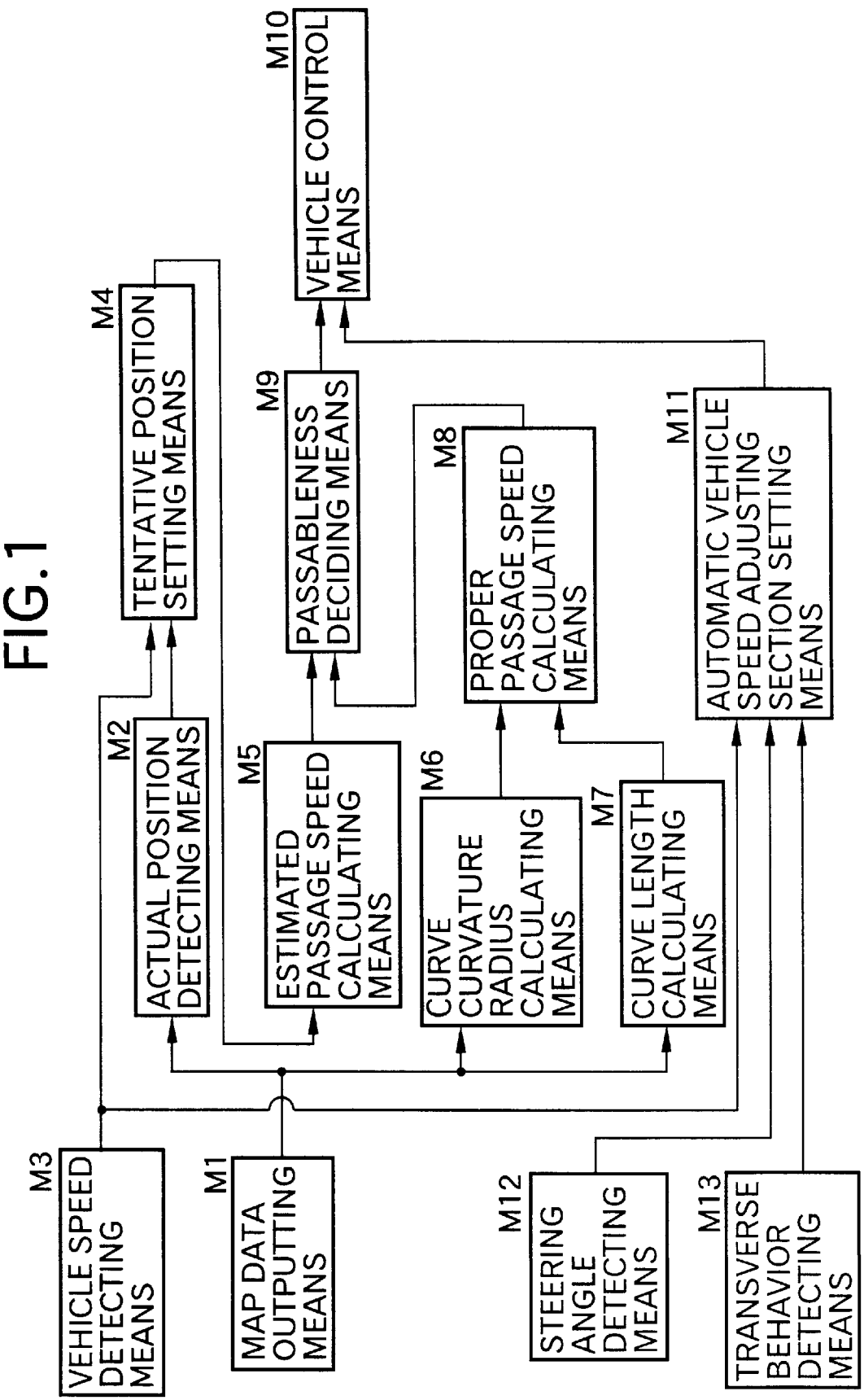
FIG. 1 is a block diagram showing the entire construction of a vehicle control system according to the presently preferred embodiment of the invention.

As shown in FIG. 1, the vehicle control system of the present embodiment is constructed to comprise map data outputting means M1, actual position detecting means M2, vehicle speed detecting means M3, tentative position setting means M4, estimated passage speed calculating means M5, curve curvature radius calculating means M6, curve length calculating means M7, proper passage speed calculating means M8, passableness deciding means M9, vehicle control means M10, automatic vehicle speed adjusting section setting means M11, steering angle detecting means M12 and transverse behavior detecting means M13.

The map data outputting means M1 and the actual position detecting means M2 are preferably mounted on a well-known navigation system. The map data outputting means M1 reads out and outputs the road data covering a predetermined range, as stored in advance in an IC card or CD-ROM. The actual position detecting means M2 detects the actual position $P_0$ on the map by overlapping the road data and the actual position data, as received from a GPS antenna, for example. The vehicle speed detecting means M3 detects the current vehicle speed $V_0$ of the vehicle on the basis of the outputs of wheel speed sensors fitted to the individual wheels.

The tentative position setting means M4 sets such a tentative own position $P_1$ ahead of the actual position $P_0$ as is used for deciding the passableness of the road. The estimated passage speed calculating means M5 calculates an estimated passage speed $V_1$ of the vehicle at the tentative position $P_1$ when the speed is decelerated at a predetermined rate from the actual position $P_0$. The curve curvature radius calculating means M6 and the curve length calculating means M7 calculate the radius of curvature of the curve at the tentative position $P_1$ and the curve length extending forward from the tentative position $P_1$ on the basis of the road data of the map data outputting means M1.

The proper passage speed calculating means M8 calculates a proper passage speed $V_R$ for passing the curve at a transverse acceleration of not more than a predetermined value. The passableness deciding means M9 decides the passableness of the curve by comparing the estimated passage speed $V_1$ and the proper passage speed $V_R$. The vehicle control means M10 decelerates the vehicle by the automatic vehicle speed adjustment so as to allow safe passage of the curve when it is decided that the curve cannot be safely passed.

In order to prevent the automatic vehicle speed adjustment from interfering with the driving operation of the driver while the curve is being followed, the automatic vehicle speed adjusting section setting means M11 sets the automatic vehicle speed adjusting section for allowing the action of the vehicle control means M10 on the basis of the steering angle, as detected by the steering angle detecting means M12, or the transverse behavior amount (e.g., the transverse acceleration or yawing rate), as detected by the transverse behavior detecting means M13.

Figure 2:
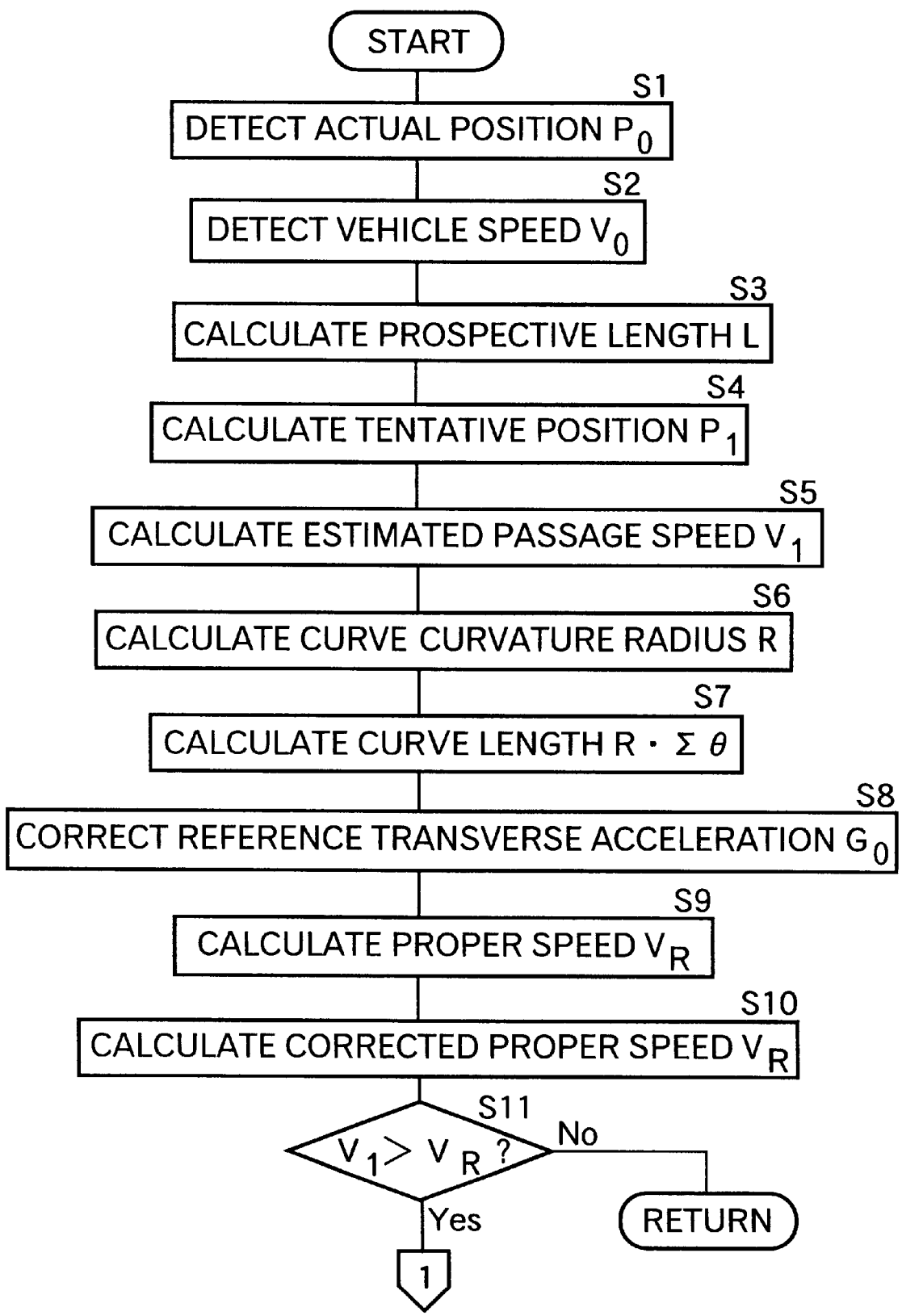
FIG. 2 is a first portion of a flow chart for explaining the operations of the control system of FIG. 1.
Figure 3:
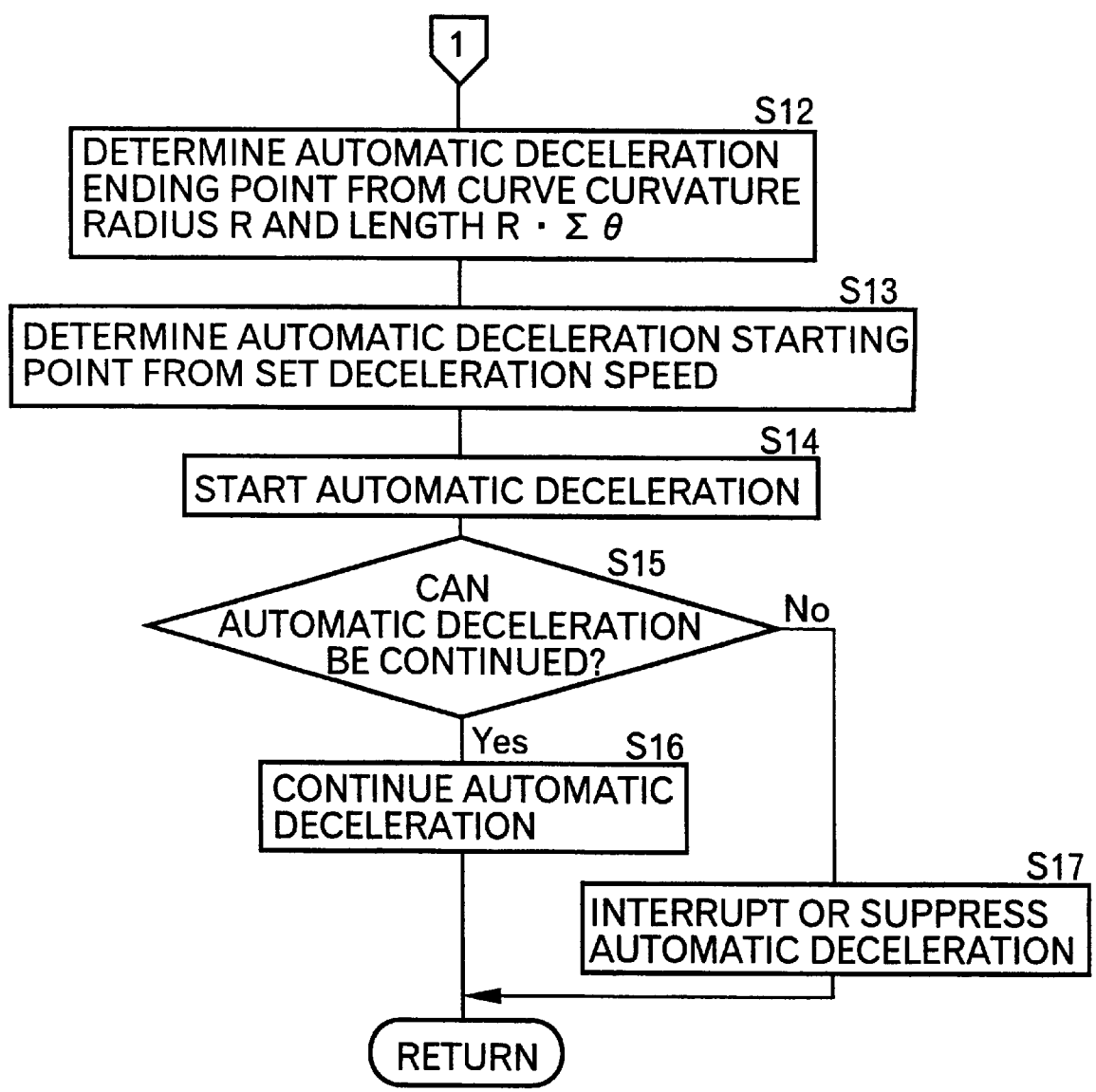
FIG. 3 is a second portion of the flow chart for explaining the system operations.

The operations described above will be described in more detail with reference to the flow charts of FIGS. 2 and 3.

First of all, the current actual position $P_0$ is detected at step S1 by the actual position detecting means M2, and the current vehicle speed $V_0$ is detected at step S2 by the vehicle speed detecting means M3. Subsequently, a prospective length L is calculated at step S3 on the basis of the vehicle speed $V_0$. The prospective length L is calculated by multiplying the vehicle speed $V_0$ by a predetermined prospective time period T, for example:

$$L = V_0 \times T \tag{1}$$

Subsequently, at step S4, the tentative position $P_1$ is set ahead of the actual position $P_0$ by the prospective length L by the tentative position setting means M4. At step S5, the estimated passage speed $V_1$ or the vehicle speed at the tentative position $P_1$ is calculated by the estimated passage speed calculating means M5. The estimated passage speed $V_1$ is calculated on the basis of the current vehicle speed $V_0$, the prospective time period T, a deceleration $dV_0/dt$ or the differentiated value of the current vehicle speed $V_0$ with time, as follows:

$$V_1 = V_0 + T \times (dV_0/dt) \tag{2}$$

Figure 4:
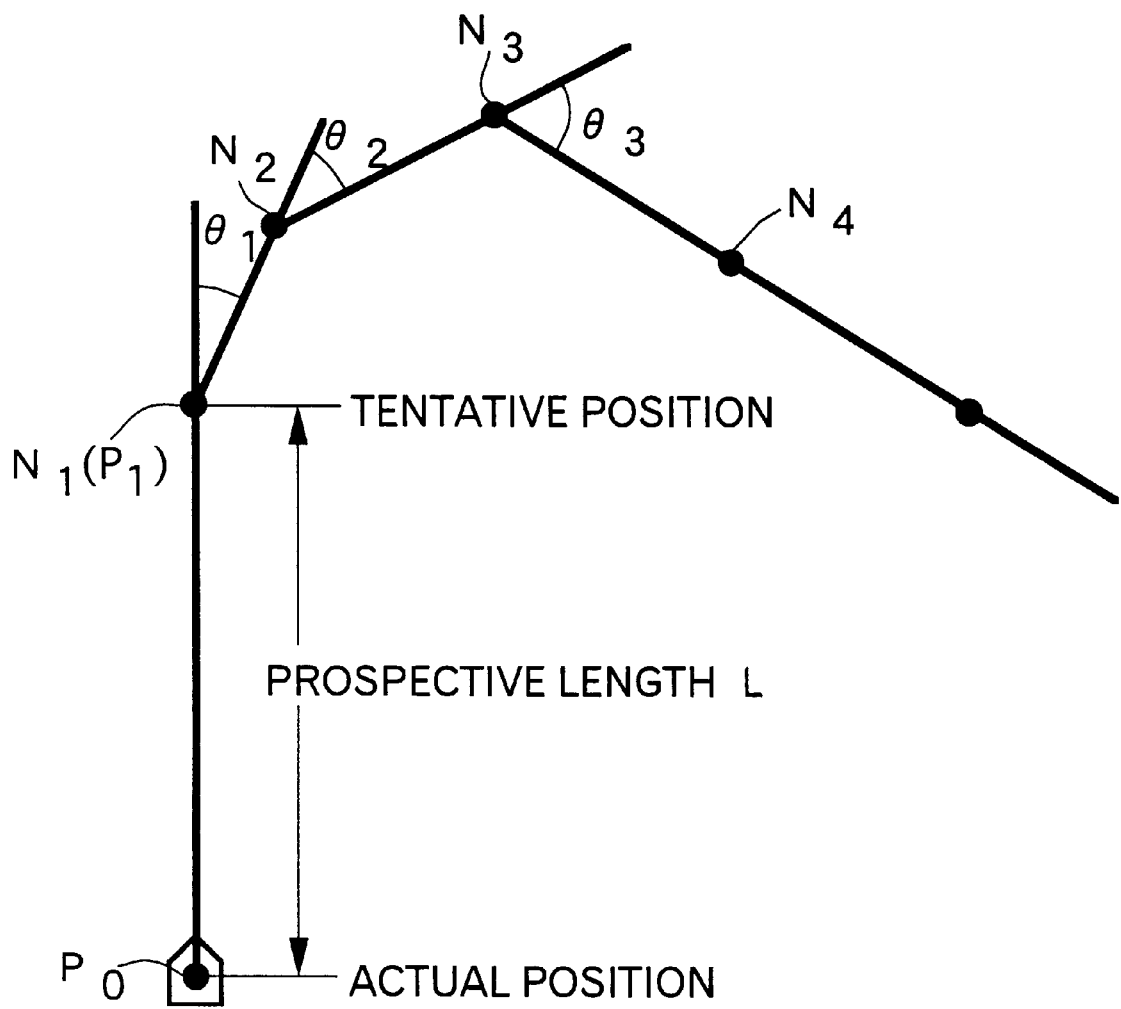
FIG. 4 is an explanatory diagram of a method for calculating the length of a curve according to the invention.

As apparent from FIG. 4, the data of the road, as obtained from the map data outputting means M1, ahead of the subject vehicle are composed of a set of numerous nodes (N) having coordinates (X, Y) individually. The node the closest to the tentative position $P_1$ is selected as the first node $N_1$, and the nodes ahead are sequentially selected as a second node $N_2$, a third node $N_3$, a fourth node $N_4$, - - -, and so on. When the road is approximated by the polygonal lines joining the individual nodes $N_1$, $N_2$, $N_3$, - - -, and so on, the angles, as made by the individual segments of the polygonal lines at the individual nodes $N_1$, $N_2$, $N_3$, - - -, and so on, are defined as angles of intersection $\theta_1$, $\theta_2$, $\theta_3$, - - -, and so on.

Figure 5:
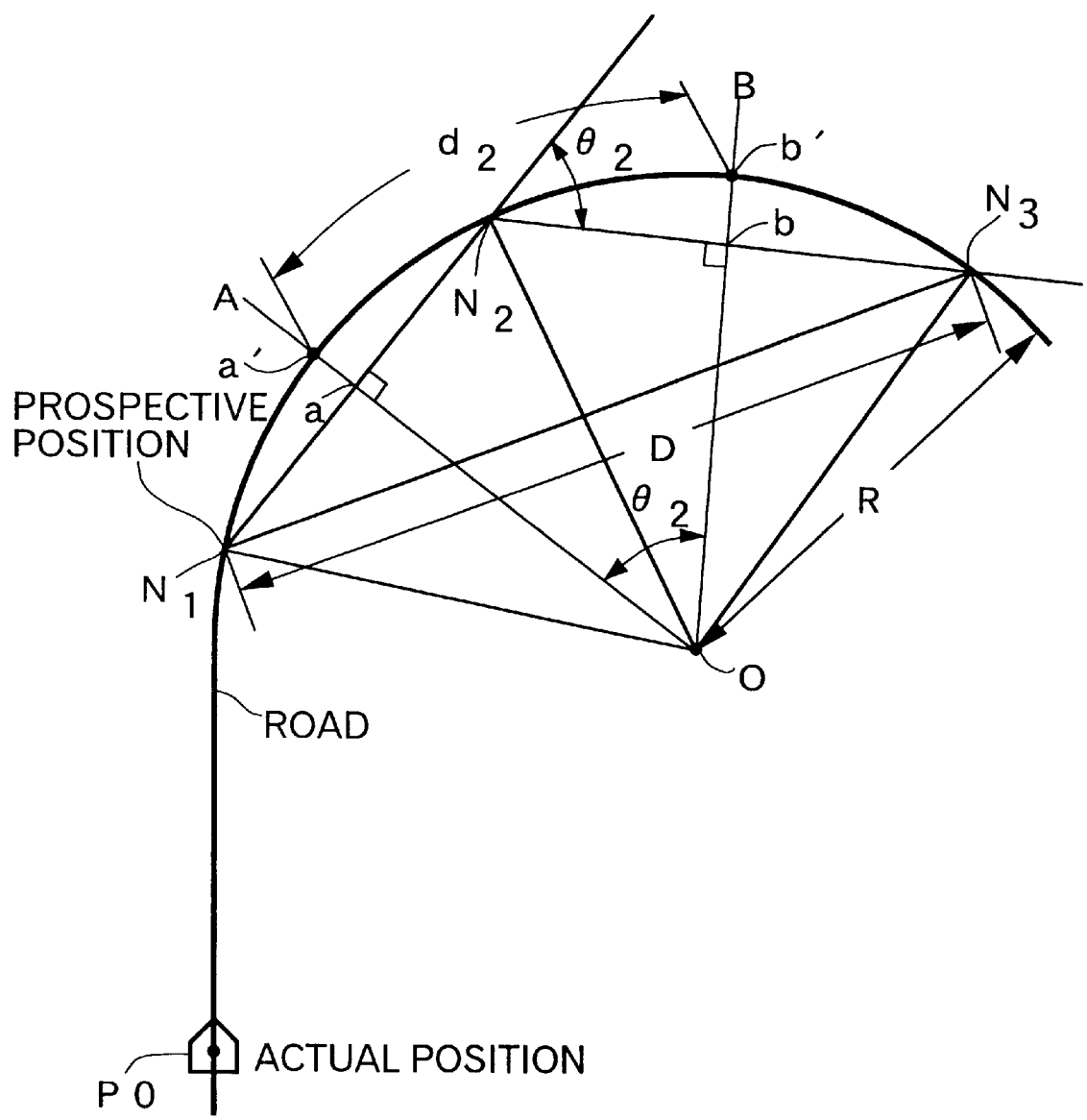
FIG. 5 is an explanatory diagram of a method for calculating the radius of curvature of a curve according to the embodiment of the invention.

At step S6, the radii of curvature R of the road at the aforementioned individual nodes $N_1$, $N_2$, $N_3$, - - -, and so on are calculated by the curve curvature radius calculating means M6. FIG. 5 shows a method for calculating the curvature radius R of the road at the second node $N_2$, for example. Specifically, the center O of an arc passing through the first node $N_1$, the second node $N_2$ and the third node $N_3$ is located at an intersection of a perpendicular bisector A passing through a midpoint a of the segment $N_1$, $N_2$, joining the first node $N_1$ and the second node $N_2$ and a perpendicular bisector B passing through a midpoint b of the segment $N_2$ $N_3$ joining the second node $N_2$ and the third node $N_3$. The intersection angle $\theta_2$ at the second node $N_2$ is equal to an angle aOb made between the two perpendicular bisectors A and B. On the other hand, an angle $N_1 ON_3$ is $2\theta_2$ or twice as large as the aforementioned angle aOb. The curvature radius R of the aforementioned arc (i.e., the curvature radius R of the road at the second node $N_2$) is given by the $N_1$ following Formula: if the distance between the first node $N_1$ and the third node $N_3$ is designated by D:

$$R = D/2 \sin \theta_2 \qquad (3).$$

When the curvature radius R of the road corresponding to the tentative position $P_1$ is thus calculated, the length of the curve is calculated at step S7 by the curve length calculating means M7. If the intersections of the aforementioned perpendicular bisectors A and B with the arc are designated by a' and b' in FIG. 5, the length $d_2$ of the arc a'b' is given by $d_2 = R \times \theta_2$. If the curvature radius R is assumed to be substantially constant over the total length of the curve, therefore, the total length d of the curve is approximated by the following Formula:

$$d = d_1 + d_2 + d_3 + \cdots = R(\theta_1 + \theta_2 + \theta_3 + \cdots) \qquad (4).$$

In other words, the total length d of the curve is substantially given by the $\Sigma\theta$ or the sum of the intersection angles $\theta_1, \theta_2, \theta_3, \text{-} \text{-} \text{-}$, and so on multiplied by the curvature radius R.

Since the measurement of the total length $R \cdot \Sigma\theta$ of the curve up to a point far ahead of the tentative position $P_1$ has no meaning at this time, the remotest object node N is determined according to the current vehicle speed $V_0$. In another plan, the distance over which the vehicle runs at the current vehicle speed $V_0$ for a predetermined time period (e.g., 10 seconds) is determined, and the remotest node N existing within the distance may be included in the object. Moreover, since the summation of the angles $\Sigma\theta$ indicative of the curve has no meaning at the present time if the curve is not significantly large, even when a node N at this side of the remotest node N comes to have an intersection angle $\theta$ which is not more than a predetermined threshold value (e.g., 5 degrees), or when the intersection angle $\theta$ at the node is reversed ($\theta$ has an opposed sign), the summation of the intersection angles $\theta_1, \theta_2, \theta_3, \text{-} \text{-} \text{-}$, and so on is discontinued.

This will be specifically described according to an example in which the predetermined threshold value is set at 5 degrees. When the intersection angles $\theta_1, \theta_2$ and $\theta_3$ of the first node $N_1$, the second node $N_2$ and the third node $N_3$ are 8 degrees, 6 degrees and 4 degrees respectively, for example, the intersection angle $\theta_3$ of the third node $N_3$ is not more than 5 degrees. Therefore, the summation is interrupted after the intersection angles $\theta_1$ and $\theta_2$ of the first node $N_1$ and the second node $N_2$, and it is decided that the total length $R \cdot \Sigma\theta$ of the curve is 8 degrees+6 degrees=14 degrees multiplied by the radius R. It is quite natural that the total length $R \cdot \Sigma\theta$ of the curve is zero if the intersection angle $\theta_1$ of the first node $N_1$ is not more than 5 degrees.

Next, a reference transverse acceleration $G_0$ is corrected at step S8. This reference transverse acceleration $G_0$ is a threshold value for deciding whether or not the vehicle can safely pass the curve, depending upon whether or not the transverse acceleration, as established during the passage of the curve, exceeds the reference transverse acceleration $G_0$. At a high vehicular speed or with a small curvature radius of a curve, the actual transverse acceleration of the vehicle may be larger than the reference transverse acceleration $G_0$ so that the vehicle can hardly pass the curve. At a low vehicle speed or with a large curvature radius of the curve, the actual transverse acceleration of the vehicle is typically below the reference transverse acceleration $G_0$ so that the vehicle can easily pass the curve.

In the present embodiment, the preset reference transverse acceleration $G_0$ is corrected at first according as whether or not there is another vehicle running ahead or in the opposite direction. This is because free run of the subject vehicle may be disturbed by the other vehicle running ahead or in the opposite direction. Thus, the reference transverse acceleration $G_0$ is corrected to a lower side to cause the automatic deceleration earlier so that the subject vehicle can pass the curve without fail.

The presence of another vehicle running ahead or in the opposite direction can be detected either by a radar sensor or CCD camera mounted on the subject vehicle or by communications between vehicles or between the vehicle and the road. Depending upon how much the preceding or oncoming vehicle obstructs the subject vehicle, a correction coefficient $k_1$ ($k_1 < 1$) is set to make a correction to a reducing side by multiplying the reference transverse acceleration $G_0$ by the correction coefficient $k_1$, as follows:

$$G_0 \leftarrow k_1 \times G_0 \qquad (5).$$

In the present embodiment, moreover, the reference transverse acceleration $G_0$ is corrected according to the intention of the driver for accelerating the vehicle. This is made to eliminate any possibility of causing interference of the accelerating operation of the driver with the automatic deceleration, such as in situations where the automatic deceleration would otherwise be effected prematurely when the driver is about to accelerate the vehicle by depressing the accelerator pedal abruptly so as to avoid a danger. Therefore, the reference transverse acceleration $G_0$ is corrected to a higher side to delay the automatic deceleration to thereby avoid interfering with the accelerating operation of the driver.

The accelerating intention of the driver can be detected by the timewise rate of change of the accelerator opening, as detected by an accelerator pedal opening sensor. In accordance with the magnitude of the timewise rate of change of the accelerator opening, a correction coefficient $k_2$ ($k_2 > 1$) is set to correct the reference transverse acceleration $G_0$ to an increasing side by multiplying it by the correction coefficient $k_2$, as follows:

$$G_0 \leftarrow k_2 \times G_0 \qquad (6).$$

Subsequently, a passableness speed $V_R$ allowing the vehicle to pass the curve without fail is calculated at step S9 by the following Formula on the basis of the curvature radius R of the curve, as calculated at step S6, and the reference transverse acceleration $G_0$ corrected at step S8:

$$V_R = (R \times G_0)^{1/2} \qquad (7).$$

The passableness speed $V_R$ takes a larger value as the curvature radius R of the curve becomes larger. That is, the more gentle the curve is, the more easily the vehicle can pass the curve, and the passableness speed $V_R$ takes the larger value for the larger reference transverse acceleration $G_0$. In other words, the larger the passableness speed $V_R$ is, the less the preceding or oncoming vehicle obstructs, and the more likely the intention of the driver for accelerating the vehicle is.

Subsequently, on the basis of the length $R \cdot \Sigma\theta$ of the curve calculated at step S7, the passableness speed $V_R$, as calculated at step S9, is corrected at step S10 by the following Formula to calculate a corrected passableness speed $V_R$:

$$V_R \leftarrow k_3 \times V_R \quad (8).$$

Here, letters $k_3$ designate a correction coefficient smaller than 1, as set according to the length $R \cdot \Sigma\theta$ of the curve, as plotted in FIG. 6. The correction coefficient k3 becomes larger for the shorter curve length $R \cdot \Sigma\theta$, so that the corrected passableness speed $V_R$ becomes correspondingly higher. For the larger curve length $R \cdot \Sigma\theta$, the correction coefficient $k_3$ becomes smaller so that the corrected passableness speed $V_R$ becomes lower.

As illustrated in FIG. 7, the passableness is different for different curve lengths $R \cdot \Sigma\theta$ even if the curves have an equal curvature radius R. The short curve, as shown in FIG. 7A, can be safely passed at a relatively high speed, but the long curve, as shown in FIG. 7C, cannot be safely passed unless at a relatively low speed. This will be reasoned by the following items 1 and 2.

Figure 8:
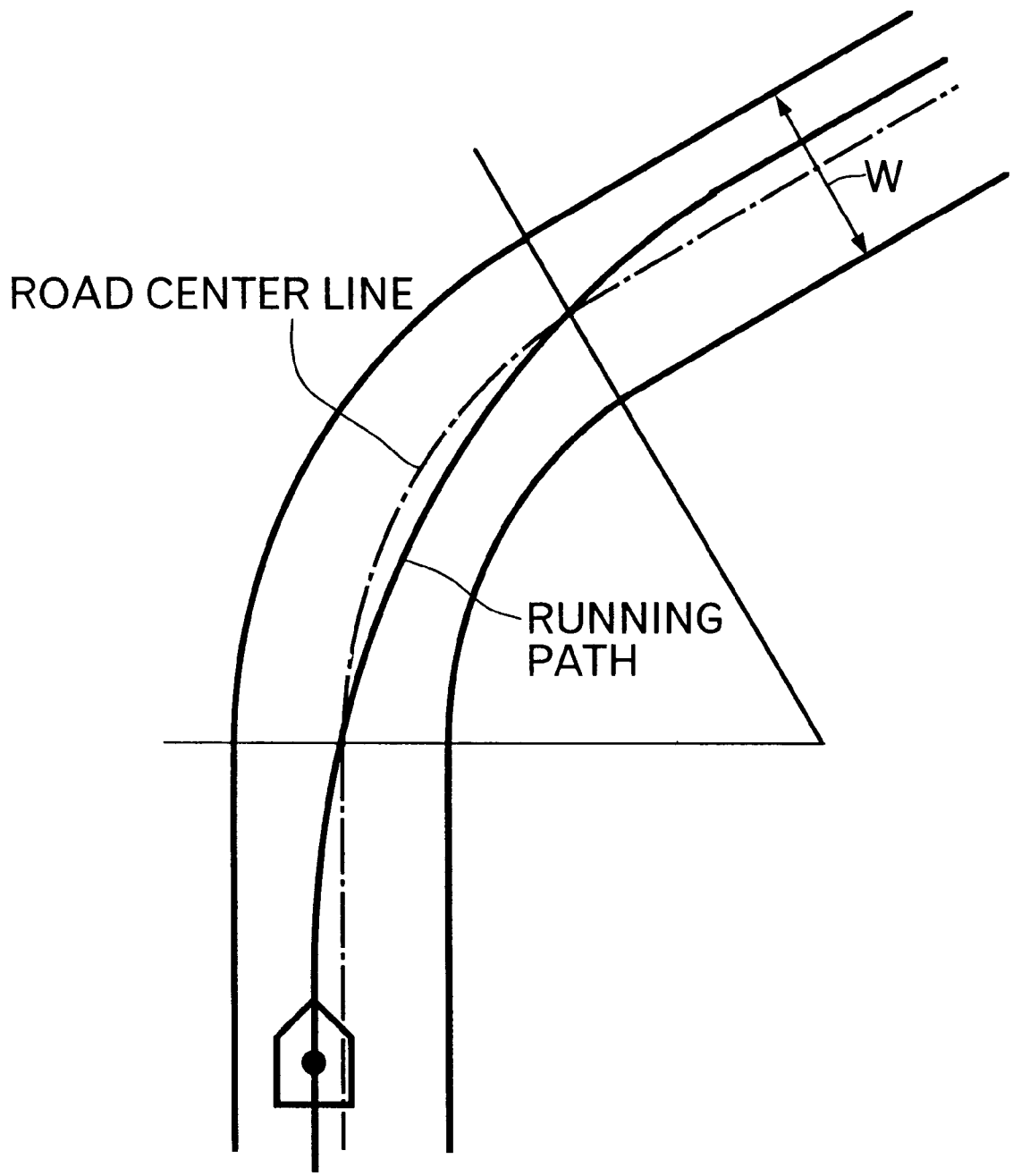
FIG. 8 is a diagram illustrating a path of a vehicle when a short curve is passed.

1. Since the road shown in FIG. 8 has a predetermined width W, the vehicle is enabled to run with a larger curvature radius than that of the center line of the road (indicated by a broken line), if the curve is short, by selecting a suitable running path, as indicated by the solid line.

2. Even if a given transverse acceleration is applied to the vehicle, the vehicle takes a short time period to pass a curve, if short, so that the aforementioned transverse acceleration exerts less influence upon the vehicle behaviors. If the curve is long, however, the vehicle takes a long time period to pass the curve, so that the given transverse acceleration exerts more influence upon the vehicle behaviors As described above, the passableness speed $V_R$, as determine according to the curvature radius R of the curve, is corrected according to the length $R \cdot \Sigma\theta$ of the curve to determine the corrected passableness speed $V_R$ so that the corrected passableness speed $V_R$ can be optimized for the actual difficulty or easiness of the curve passage.

Subsequently, at step S11, the estimated passage speed $V_1$ at the tentative position $P_1$, as calculated at step S5, and the corrected passableness speed $V_R$, as calculated at step S10, are compared by the passableness deciding means M9. When the estimated passage speed $V_1$ is not more than the passableness speed $V_R$, it is decided that the curve can be passed without the automatic deceleration by the vehicle control means M10, and the routine is returned to step S1. When the estimated passage speed $V_1$ exceeds the passableness speed $V_R$ at step S10, on the other hand, the routine transfers to step S12 for executing the automatic deceleration by the vehicle control means M10 to safely pass through the curve.

When the automatic deceleration is to be executed because the estimated passage speed $V_1$ exceeds the passableness speed $V_R$, there arises no problem if the automatic deceleration is executed before the vehicle enters the curve. If the automatic deceleration is executed while the vehicle is running along the curve, the voluntary steering operation or braking operation of the driver for passing the curve may interfere with the automatic deceleration to give the driver an unfamiliar or unpleasant feeling. At subsequent steps S12 to S17, therefore, the automatic vehicle speed adjusting section is set by the automatic vehicle speed adjusting section setting means M11 so that the automatic deceleration is executed when predetermined conditions are satisfied in the automatic vehicle speed adjusting section.

At first, an automatic deceleration ending point for ending the automatic deceleration is determined at step S12. According to a first method for determining the automatic deceleration ending point, the reference transverse acceleration $G_0$, as corrected at step S8, is reduced at a predetermined rate to set a second reference transverse acceleration $G_0'$, and the automatic deceleration is ended when the vehicle reaches a node N, at which the transverse acceleration of the vehicle exceeds the second reference transverse acceleration $G_0'$. Generally, the curvature radius of a curve is large at the entrance and is gradually reduced to take a minimum value at an intermediate portion of the curve. If the second reference transverse acceleration $G_0'$ is set to end the automatic deceleration, as described above, this automatic deceleration is inhibited at the intermediate portion of the curve having the least curvature radius so that any steering operation or braking operation of the driver likely to occur after reaching the intermediate portion will not be interfered with by the automatic deceleration.

According to a second method, on the other hand, a reference length $R \cdot \Sigma\theta'$ of a curve is set in advance so that the automatic deceleration is ended at the node N where the curve length $\theta_1 + \theta_2 + \theta_3 + \cdots$ exceeds the reference length $R \cdot \Sigma\theta'$.

Subsequently, an automatic deceleration starting point for starting the automatic deceleration is determined at step S13. This automatic deceleration starting point is set as the node N capable of lowering the vehicle speed to the passableness speed $V_R$ until the automatic deceleration ending point is reached, when the deceleration is done at a preset rate from the current vehicle speed.

When the automatic deceleration starting point and the automatic deceleration ending point are thus determined, the automatic deceleration is started at step S14 by the vehicle control means M10 when the automatic deceleration starting point is reached, and the automatic deceleration is ended when the automatic deceleration ending point is reached.

Figure 9:
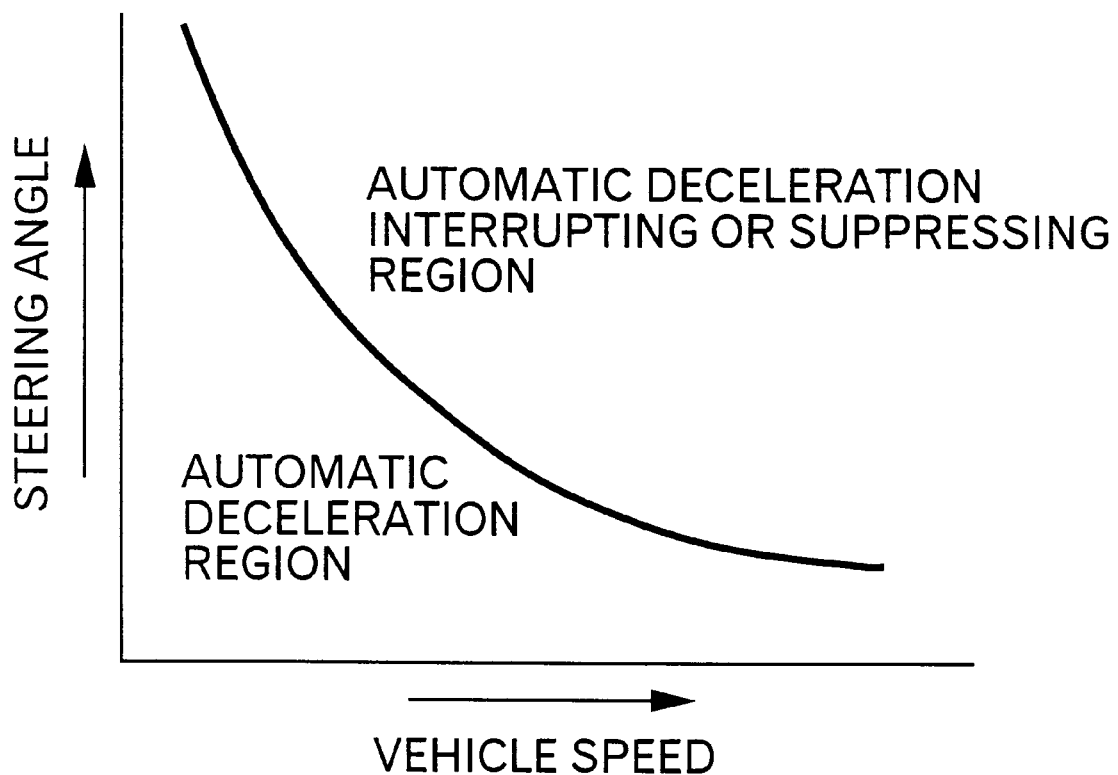
FIG. 9 is a graph illustrating execution and inexecution regions of an automatic deceleration on the basis of a vehicle speed and a steering angle according to the invention.

During the automatic deceleration, the vehicle speed and the steering angle are monitored by the vehicle speed detecting means M3 and the steering angle detecting means M12. When it is decided at step S15 that the vehicle speed and the steering angle are in the automatic deceleration region of FIG. 9, namely, that the intention of the driver to control the vehicle voluntarily is low, the automatic deceleration is continued as it is at step S16. On the other hand, when the vehicle speed and the steering angle are in the automatic deceleration interruption or suppression region of FIG. 9, namely, when the intention of the driver to control the vehicle voluntarily is high, the automatic deceleration is interrupted or suppressed at step S17. As a result, the voluntary control operation of the driver is prevented from interfering with the automatic deceleration so as not to give the driver any unfamiliar feeling or impression.

In place of the interruption or suppression of the automatic deceleration on the basis of the vehicle speed or the steering angle, on the other hand, there can be provided transverse behavior detecting means M13 for detecting the amount of transverse behavior (such as the transverse acceleration or yawing rate) of the vehicle, so that the automatic deceleration may be interrupted or suppressed when the detected transverse acceleration or yawing rate exceeds a predetermined threshold value.

According to the invention, as has been described hereinbefore, when the passableness deciding means decides the passableness by comparing the passableness speed of the curve and the estimated passage speed of the curve, the passableness speed of the curve can be calculated based on the curve length in addition to the curvature radius of the curve. As a result, the passableness can be properly decided according to the actual difficulty in the passage of the curve.

On the other hand, the curve length is calculated on the basis of the sum of the intersection angles of the individual segments joining adjoining ones of the coordinate points. As a result, the curve length can be calculated easily and reliably from the coordinate points of the road.

Further, the sum of the intersection angles of the individual segments according to the invention is the sum of the continuous intersection angles each being not less than a predetermined angle. As a result, the length of the curve can be prevented from being calculated longer than the actual value thereof.

Still further, the number of continuous intersection angles to be summed is preferably restricted on the basis of the vehicle speed. As a result, the length of the curve can be prevented from being calculated longer than necessary, when the vehicle speed is low.

Further yet, the number of continuous intersection angles to be summed is preferably restricted on the basis of a predetermined time period. As a result, the length of the curve can be further reliably prevented from being calculated longer than necessary, when the vehicle speed is low.

Preferably, the vehicle control means includes the automatic vehicle speed adjusting means for adjusting the vehicle speed automatically, and the automatic vehicle speed adjusting section setting means setting the automatic vehicle speed adjusting section for allowing the automatic vehicle speed adjustment in the curve. When the vehicle passes through the curve, the automatic vehicle speed adjusting means adjusts the vehicle speed automatically in the automatic vehicle speed adjusting section. As a result, when the vehicle passes through the curve, the automatic vehicle speed adjustment is prevented from being actuated excessively frequently because it could otherwise interfere with the driving operation of the driver.

Also, the automatic vehicle speed adjusting section may be set on the basis of a reference transverse acceleration in the curve. As a result, the voluntary driving operation of the driver, which is likely to occur at a central portion of the curve, will not be interfered with by the automatic vehicle speed adjustment at the central portion, which provides the minimum radius of curvature, of the curve.

According to yet another aspect of the invention as described above, the automatic vehicle speed adjusting section is calculated on the basis of the sum of the intersection angles of the individual segments joining the adjacent coordinate points. As a result, the automatic vehicle speed adjusting section can be calculated easily and reliably from the coordinate points of the road.

According to further aspects of the disclosed invention, the vehicle control means includes the automatic vehicle speed adjusting means for adjusting the vehicle speed automatically, and either the steering angle detecting means detecting the steering angle, or the transverse behavior detecting means detecting the amount of transverse behavior of the vehicle is preferably provided. The automatic vehicle speed adjusting means interrupts or suppresses the automatic vehicle speed adjustment when the vehicle speed, steering angle or amount of transverse behavior falls within a predetermined range while the vehicle speed is being automatically adjusted. As a result, it is possible to avoid interfering with the voluntary driving operation of the driver by the automatic vehicle speed adjustment.

Although the present invention has been described in detail in connection with the presently preferred embodiment, it will be understood by persons skilled in the art that variations and modifications may be made thereto without departing from the gist, spirit or essence thereof.

For example, the vehicle control means M10 is not restricted to one for adjusting the vehicle speed by an automatic braking operation, but may reduce the vehicle speed by lowering the engine output. Prior to the automatic deceleration, moreover, warning means such as a buzzer or lamp may be actuated to urge the driver to decelerate the vehicle.

The scope of the invention is indicated by the appended claims rather than by the foregoing description of the presently preferred embodiment.

I claim:

1. A vehicle control system comprising:

map data outputting means for outputting map data including coordinate points of a road to be followed by a vehicle;

actual position detecting means for detecting an actual position of the vehicle on a map;

vehicle speed detecting means for detecting a vehicle speed;

tentative position setting means for setting a tentative position on the road ahead of the actual position of the vehicle;

estimated passage speed calculating means for calculating an estimated passage speed in the tentative position on the basis of a distance between the actual position and the tentative position;

curve curvature radius calculating means for calculating a radius of curvature of a curve existing on the road ahead of the tentative position on the basis of the map data;

curve length calculating means for calculating the length of the curve existing on the road ahead of the tentative position on the basis of the map data;

proper passage speed calculating means for calculating a proper curve passing speed on the basis of the curve curvature radius and the length of the curve;

passableness deciding means for deciding the passableness of the vehicle through the curve by comparing the estimated passage speed and the proper curve passing speed; and vehicle control means for controlling the vehicle when said passableness deciding means decided that the vehicle cannot safely pass the curve.

2. A vehicle control system as set forth in claim 1, wherein said curve length is calculated on the basis of the sum of the angles of intersections of segments joining adjoining ones of the coordinate points.

3. A vehicle control system as set forth in claim 2, wherein the sum of the intersection angles of the individual segments is a sum of continuous intersection angles each being not less than a predetermined angle.

4. A vehicle control system as set forth in claim 3, wherein the number of said continuous intersection angles to be summed is varied on the basis of the vehicle speed.

5. A vehicle control system as set forth in claim 4, wherein the number of said continuous intersection angles to be summed is further restricted on the basis of a predetermined time period.

6. A vehicle control system as set forth in claim 1, wherein said vehicle control means includes automatic vehicle speed adjusting means for adjusting the vehicle speed automatically, and the system further comprises automatic vehicle speed adjusting section setting means for setting an automatic vehicle speed adjusting section allowing an automatic vehicle speed adjustment in the curve, wherein said automatic vehicle speed adjusting means adjusts the vehicle speed automatically in the automatic vehicle speed adjusting section when the vehicle passes the curve.

7. A vehicle control system as set forth in claim 6, wherein the automatic vehicle speed adjusting section is set on the basis of a reference transverse acceleration in the curve.

8. A vehicle control system as set forth in claim 6, wherein the automatic vehicle speed adjusting section is set on the basis of the sum of the intersection angles of individual segments joining adjacent ones of the coordinate points.

9. A vehicle control system as set forth in claim 1, wherein said vehicle control means includes automatic vehicle speed adjusting means for adjusting the vehicle speed automatically, and the system further comprises steering angle detecting means for detecting a steering angle, wherein said automatic vehicle speed adjusting means interrupts the automatic vehicle speed adjustment when at least one of the vehicle speed and the steering angle falls within a predetermined range therefor while the vehicle speed is being automatically adjusted.

10. A vehicle control system as set forth in claim 1, wherein said vehicle control means includes automatic vehicle speed adjusting means for adjusting the vehicle speed automatically, and the system further comprises steering angle detecting means for detecting a steering angle, wherein said automatic vehicle speed adjusting means restricts an amount of automatic vehicle speed adjustment effected when at least one of the vehicle speed and the steering angle falls within a predetermined range therefor while the vehicle speed is being automatically adjusted.

11. A vehicle control system as set forth in claim 1, wherein said vehicle control means includes automatic vehicle speed adjusting means for adjusting the vehicle speed automatically, and the system further comprises transverse behavior detecting means for detecting an amount of transverse behavior of the vehicle, wherein said automatic vehicle speed adjusting means interrupts the automatic vehicle speed adjustment when the amount of transverse behavior falls within a predetermined range while the vehicle speed is being automatically adjusted.

12. A vehicle control system as set forth in claim 1, wherein said vehicle control means includes automatic vehicle speed adjusting means for adjusting the vehicle speed automatically, and said system further comprises transverse behavior detecting means for detecting an amount of transverse behavior of the vehicle, wherein said automatic vehicle speed adjusting means restricts the amount of automatic vehicle speed adjustment effected when the amount of transverse behavior falls within a predetermined range while the vehicle speed is being automatically adjusted.

13. A vehicle control system according to claim 7, including means for varying said reference transverse acceleration based on whether another vehicle is present to obstruct the driver's perception of the curve.

14. A vehicle control system according to claim 7, including means for varying said reference transverse acceleration based on an intention of the driver to accelerate the vehicle.

* * * * *

UNITED STATES PATENT AND TRADEMARK OFFICE
CERTIFICATE OF CORRECTION

PATENT NO. : 5,978,731
DATED : 02 November 1999
INVENTOR(S) : Shohei Matsuda

It is certified that error appears in the above-identified patent and that said Letters Patent is hereby corrected as shown below:

Column 7, lines 29-30, change "determine" to --determined--.

Signed and Sealed this

Seventeenth Day of October, 2000

Attest:

Q. TODD DICKINSON

*Attesting Officer*     *Director of Patents and Trademarks*